UNITED STATES PATENT OFFICE.

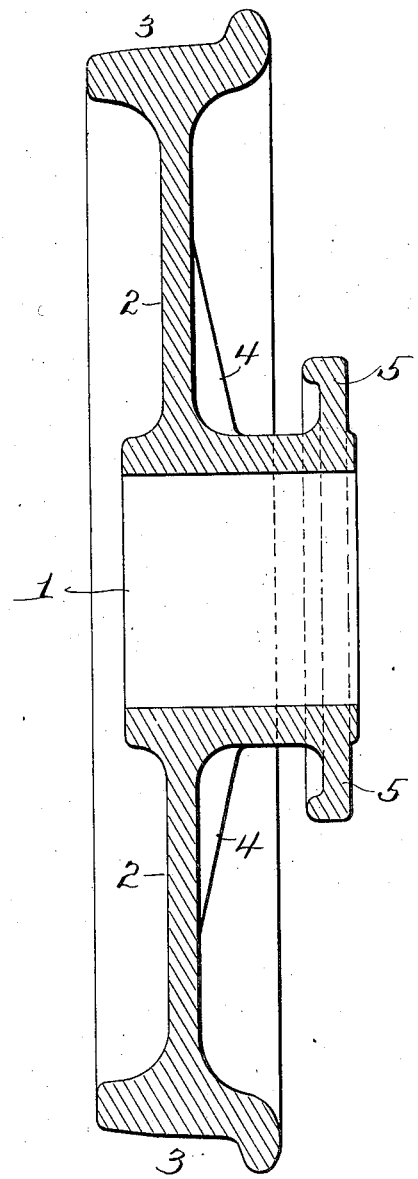

SAMUEL P. BUSH, OF COLUMBUS, OHIO.

CAR-WHEEL.

1,047,380.  Specification of Letters Patent. Patented Dec. 17, 1912.

Application filed April 13, 1912.  Serial No. 690,654.

*To all whom it may concern:*

Be it known that I, SAMUEL P. BUSH, a citizen of the United States, residing at Columbus, in the county of Franklin and State of Ohio, have invented certain new and useful Improvements in Car-Wheels; and I do hereby declare the following to be a full, clear, and exact description of the invention, such as will enable others skilled in the art to which it appertains to make and use the same.

My invention relates to an improvement in car wheels.

In securing car wheels to axles, the wheels are forced onto the axles under powerful pressure which will cause the hubs unless properly reinforced, to stretch or expand and thus be without capacity to properly grip the axles, and this is particularly true with wheels wherein the web or plate of the wheel is in a plane at right angles to the axis of the wheel and adjacent to one end of the hub, and my invention consists in a wheel of the type above referred to, the hub of which is provided at its inner end with an integral reinforcing rib encircling the hub.

The accompanying drawing is a view in transverse section of a wheel embodying my invention.

1 represents the hub, 2 the web or plate of the wheel and 3 the rim.

The web or plate 2 is approximately flat and in a plane at right angles to the axis of the wheel, and is integral with the hub at or adjacent one end of the latter. The end of the hub adjacent plate 2, terminates in a plane between the side edges of the wheel, while the opposite end of the hub projects beyond the plane of the rim as clearly shown in the drawing. If desired the plate 2 may be reinforced by the ribs 4 cast integral with the parts. The plate or web of the wheel reinforces the outer end of the hub and supports it against a bursting pressure, as when mounting it on an axle, but with wheels thus constructed the opposite end and major part of the hub is not so reinforced and my invention consists in providing the inner end of the hub with an integral reinforcing rib 5 which provides for increased gripping power when the wheel is forced into position on the axle. Having the web or plate of the wheel in a plane at right angles to the axis of the wheels, necessarily brings it nearer the outer end of the hub, and reinforces that end against a bursting pressure, but the other end being unsupported would naturally stretch and not have the necessary gripping capacity were it not for the rib 5 which prevents any stretching or expansion of the inner end of the hub.

Having fully described my invention what I claim as new and desire to secure by Letters-Patent, is:—

1. As a new article of manufacture, a car wheel comprising a hub, plate and rim all cast integral, the plate being adjacent one end of the hub, and reinforcing said end, and a peripheral rib reinforcing the other end of said hub.

2. As a new article of manufacture, a car wheel comprising a hub, plate and rim all cast integral, the plate being adjacent one end of the hub and reinforcing said end, and a peripheral rib attached to the hub only and reinforcing the other end of the latter.

In testimony whereof, I have signed this specification in the presence of two subscribing witnesses.

SAMUEL P. BUSH.

Witnesses:
 ARNO EBERLEIN,
 GEO. G. MERRING.